US012705658B2

(12) United States Patent
McNabb et al.

(10) Patent No.: US 12,705,658 B2
(45) Date of Patent: Aug. 11, 2026

(54) SYSTEMS, NON-TRANSITORY COMPUTER-READABLE MEDIUMS, AND METHODS FOR MODIFYING A GRAPHICAL USER INTERFACE BASED ON SEMANTIC ANALYSIS

(71) Applicant: Walmart Apollo, LLC, Bentonville, AR (US)

(72) Inventors: Nicole Isabel McNabb, Sunnyvale, CA (US); Rahul Devendra Sharnagat, Sunnyvale, CA (US); Krishna Sravanthi Rajanala Sai, Dublin, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 260 days.

(21) Appl. No.: 18/428,786

(22) Filed: Jan. 31, 2024

(65) Prior Publication Data

US 2025/0245715 A1 Jul. 31, 2025

(51) Int. Cl.
*G06Q 30/00* (2023.01)
*G06F 40/247* (2020.01)
(Continued)

(52) U.S. Cl.
CPC ....... *G06Q 30/0627* (2013.01); *G06F 40/247* (2020.01); *G06F 40/295* (2020.01); *G06Q 30/0643* (2013.01)

(58) Field of Classification Search
CPC ........... G06Q 30/0627; G06Q 30/0629; G06Q 30/0643; G06Q 30/06431;
(Continued)

(56) References Cited

U.S. PATENT DOCUMENTS 11,301,540 B1 * 4/2022 Boteanu ................ G06F 40/205
2009/0327223 A1 12/2009 Chakrabarti et al.
(Continued)

FOREIGN PATENT DOCUMENTS

CN 111400607 11/2020

OTHER PUBLICATIONS

S. Shirol, A. Kulkarni and R. Agarwal, "Semantic Search for Sustainable Platforms Using Transformers," 2023 International Conference on Emerging Techniques in Computational Intelligence (ICETCI), Hyderabad, India, 2023, pp. 112-118, doi: 10.1109/ICETCI58599.2023.10331079. (Year: 2023).*
(Continued)

*Primary Examiner* — Arielle E Weiner
(74) *Attorney, Agent, or Firm* — FOLEY & LARDNER LLP

(57) ABSTRACT

Systems and methods including one or more processors and one or more non-transitory storage devices storing computing instructions configured to run on the one or more processors and perform: receiving a search query from a user during a current user session; generating a query embedding for the search query; determining one or more entity embeddings with similarity scores that satisfy a threshold, the one or more entity embeddings including keywords associated with entities; filtering the one or more entity embeddings based on filtering criteria; generating a mapping for the search query based on the one or more entity embeddings, the mapping including an association between keywords in the search query and an entity; and modifying a graphical user interface to display items associated with the entity in an upper portion of the graphical user interface during the current user session. Other embodiments are disclosed herein.

20 Claims, 10 Drawing Sheets

(51) Int. Cl.
*G06F 40/295* (2020.01)
*G06Q 30/0601* (2023.01)

(58) Field of Classification Search
CPC ....... G06Q 30/06432; G06Q 30/06433; G06Q 30/06434; G06Q 30/06435; G06Q 30/0644; G06Q 30/06442; G06Q 30/06443; G06Q 30/06444; G06F 40/247; G06F 40/295
See application file for complete search history.

(56) References Cited

U.S. PATENT DOCUMENTS

2014/0214898 A1* 7/2014 Shapira ............. G06F 16/24578 707/769
2019/0392082 A1* 12/2019 Bell ......................... G06N 3/09
2021/0216576 A1 7/2021 Staub et al.
2021/0241344 A1* 8/2021 Mantha ............... G06F 16/9035
2023/0109144 A1* 4/2023 Kulangara Muriyil ...................... G06V 10/82 707/737
2023/0409614 A1* 12/2023 Hamilton ............ G06F 16/9024
2024/0370479 A1* 11/2024 Hudetz ................. G06F 16/316

OTHER PUBLICATIONS

Cheng, X., et al., An End-to-End Solution for Named Entity Recognition in eCommerce Search. Proceedings of the AAAI Conference on Artificial Intelligence. 35. 15098-15106. 10.1609/aaai.v35117.17773. Dec. 11, 2020.

* cited by examiner

Network Adapter
220
Memory ROM/RAM
208
Hard Drive
114
CD-Rom Drive
116
Universal Serial Bus
112
Disk Controller
204
Graphics Adapter
224
214
System Bus
Video Controller
202
Monitor
106
CPU
210
Keyboard Adapter
226
Keyboard
104
Mouse Adapter
206
Mouse
110
Other I/O Devices
222

500

700

0: brand / Company B
1: brand / Company A
2: character / Joe
3: character / Jim
. . .
Knowledge base "entity": "brand"
"name": Company A
"forms" "Company A", "A"
"score": 0.966 result

Knowledge database

SYSTEMS, NON-TRANSITORY COMPUTER-READABLE MEDIUMS, AND METHODS FOR MODIFYING A GRAPHICAL USER INTERFACE BASED ON SEMANTIC ANALYSIS

TECHNICAL FIELD

This disclosure relates generally to computing system management, and more particular to systems and methods for modifying a graphical user interface based on semantic analysis.

BACKGROUND

Marketplaces are responsible for millions of products at a time. With so many products offered for sale, it can be difficult for a customer to find a desired product through a search. Many marketplaces offer free-form text searches of their product databases. However, the large number of products available provides many opportunities for matching a user with irrelevant products.

BRIEF DESCRIPTION OF THE DRAWINGS

To facilitate further description of the embodiments, the following drawings are provided in which.

Figure 1:
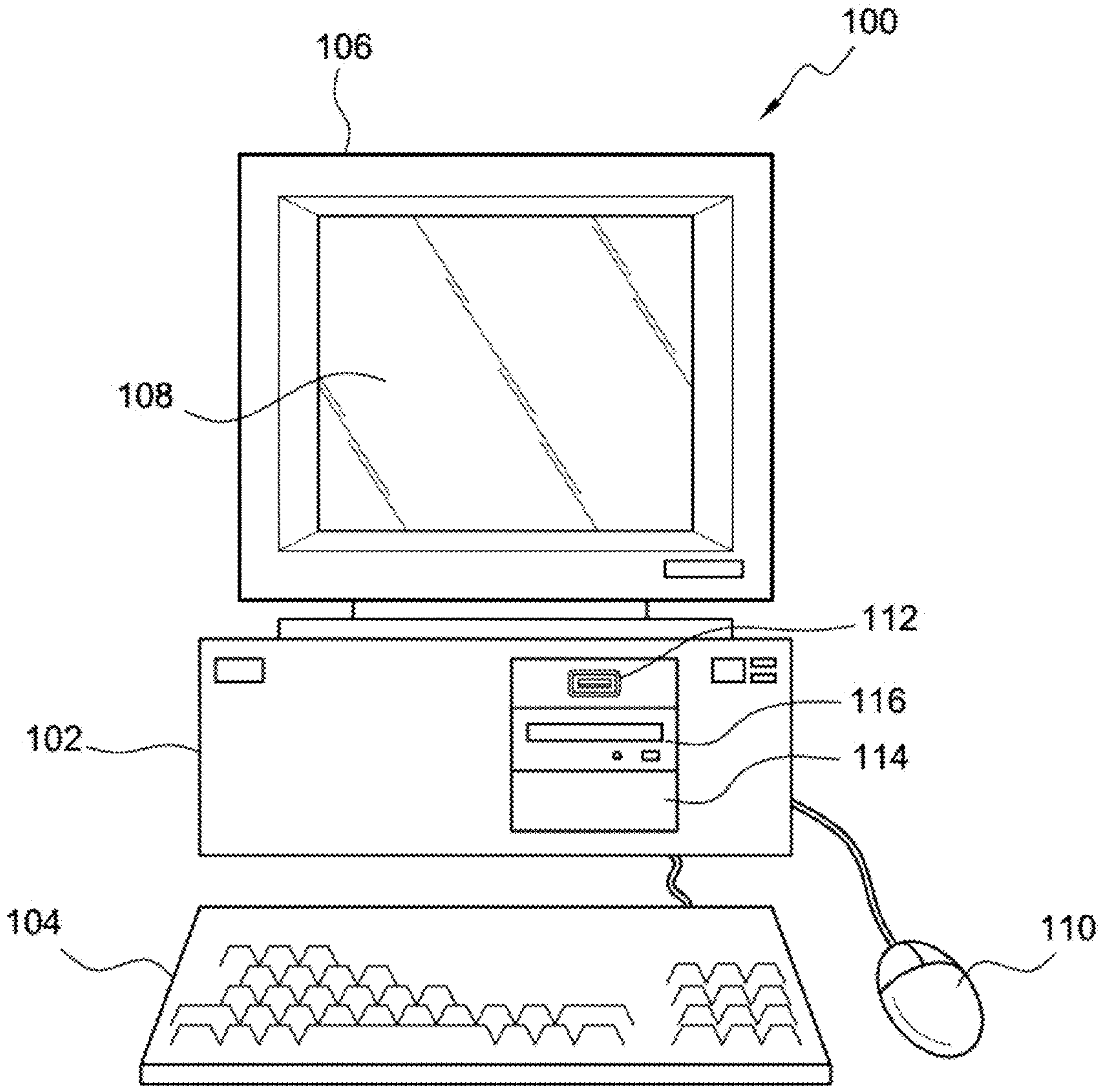
FIG. 1 illustrates a front elevational view of a computer system that is suitable for implementing various embodiments of the systems disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform: receiving a search query from a user during a current user session; generating a query embedding for the search query; determining one or more entity embeddings with similarity scores that satisfy a threshold, the one or more entity embeddings including keywords associated with entities; filtering the one or more entity embeddings based on filtering criteria; generating a mapping for the search query based on the one or more entity embeddings, the mapping including an association between keywords in the search query and an entity; and modifying a graphical user interface to display items associated with the entity in an upper portion of the graphical user interface during the current user session.

Various embodiments include a method. The method can be implemented via execution of computing instructions configured to run at one or more processors and configured to be stored at non-transitory computer-readable media. The method can comprise receiving a search query from a user during a current user session; generating a query embedding for the search query; determining one or more entity embeddings with similarity scores that satisfy a threshold, the one or more entity embeddings including keywords associated with entities; filtering the one or more entity embeddings based on filtering criteria; generating a mapping for the search query based on the one or more entity embeddings, the mapping including an association between keywords in the search query and an entity; and modifying a graphical user interface to display items associated with the entity in an upper portion of the graphical user interface during the current user session.

Figure 2:
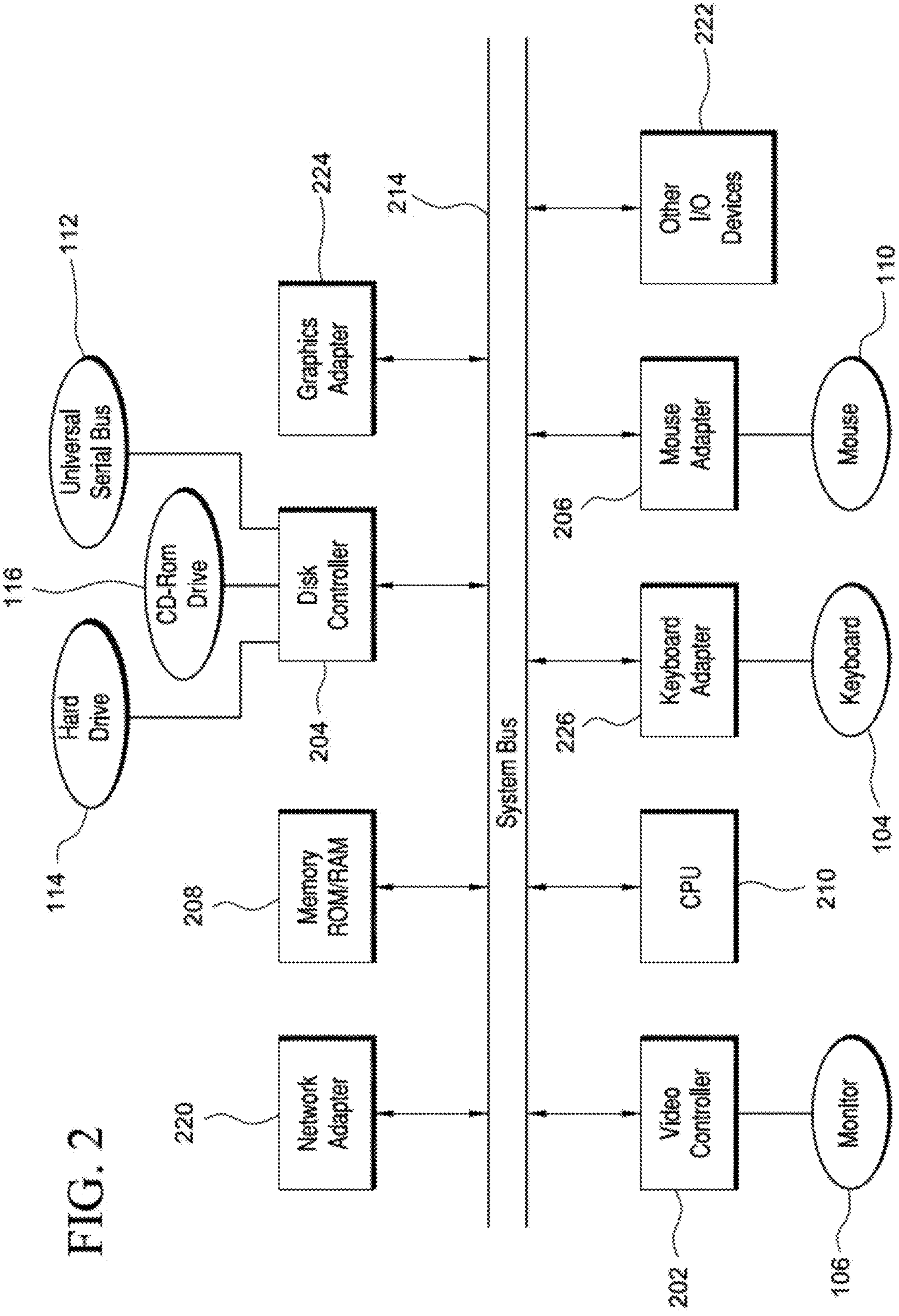
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
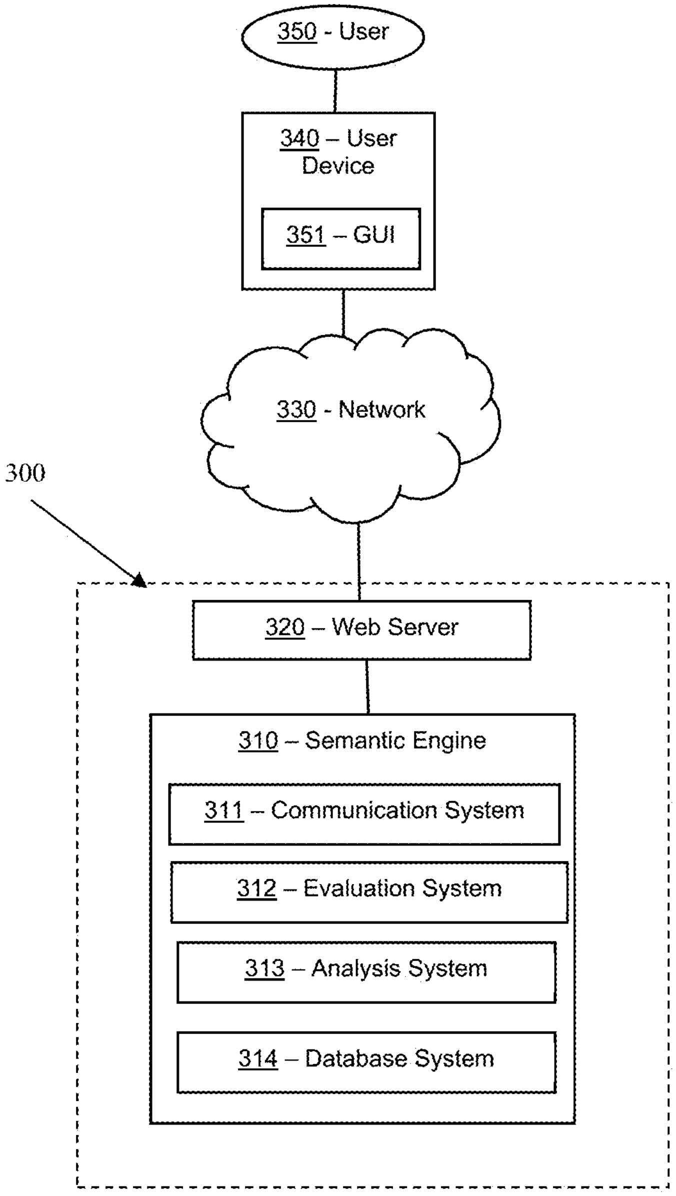
FIG. 3 illustrates a representative block diagram of a system, according to an embodiment.

Turning ahead in the drawings, FIG. 3 illustrates a block diagram of a system 300 that can be employed for semantic analysis, according to an embodiment. System 300 is merely exemplary, and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a semantic engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Semantic engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host semantic engine 310 and/or web server 320. Additional details regarding semantic engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with semantic engine 310, in addition to other suitable activities. In a number of embodiments, web server 320 can interface with semantic engine 310 when a user (e.g., 350) is viewing infrastructure components in order to assist with the analysis of the infrastructure components corresponding to semantic analysis.

In some embodiments, an internal network that is not open to the public can be used for communications between semantic engine 310 and web server 320 within system 300. Accordingly, in some embodiments, semantic engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, semantic engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to semantic engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of semantic engine 310 and/or web server 320. In a similar manner, the processors and/or the non-transitory computer-readable media can be local and/or remote to each other.

Meanwhile, in many embodiments, semantic engine 310 and/or web server 320 also can be configured to communicate with one or more databases, such as a database system 314. The one or more databases can include product catalog information, user engagement information, semantic information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, semantic engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, semantic engine 310 can include a communication system 311, an evaluation system 312, an analysis system 313, and/or database system 314. In many embodiments, the systems of semantic engine 310 can be modules of computing instructions (e.g., software modules) stored at non-transitory computer readable media that operate on one or more processors. In other embodiments, the systems of semantic engine 310 can be implemented in hardware, semantic engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host semantic engine 310 and/or web server 320. Additional details regarding semantic engine 310 and the components thereof are described herein.

In many embodiments, user device 340 can comprise graphical user interface ("GUI") 351. In the same or different embodiments, GUI 351 can be part of and/or displayed by user device 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user device 340. In the same or different embodiments, GUI 351 can comprise a website accessed through network 330. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through network (e.g., Internet) 330 with user computers (e.g., 340). In certain embodiments, user devices 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, semantic engine 310, and/or web server 320 can be configured to communicate with one or more user devices 340. In some embodiments, user devices 340 also can be referred to as customer computers. In some embodiments, semantic engine 310, and/or web server 320 can communicate or interface (e.g., interact) with one or more customer computers (such as user devices 340) through a network 330. Network 330 can be an intranet that is not open to the public. In further embodiments, network 330 can be a mesh network of individual systems. Accordingly, in many embodiments, semantic engine 310, and/or web server 320 (and/or the software used by such systems) can refer to a back end of system 300 operated by an operator and/or administrator of system 300, and user device 340 (and/or the software used by such systems) can refer to a front end of system 300 used by one or more users 350, respectively. In some embodiments, users 350 can also be referred to as customers, in which case, user device 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Figure 4:
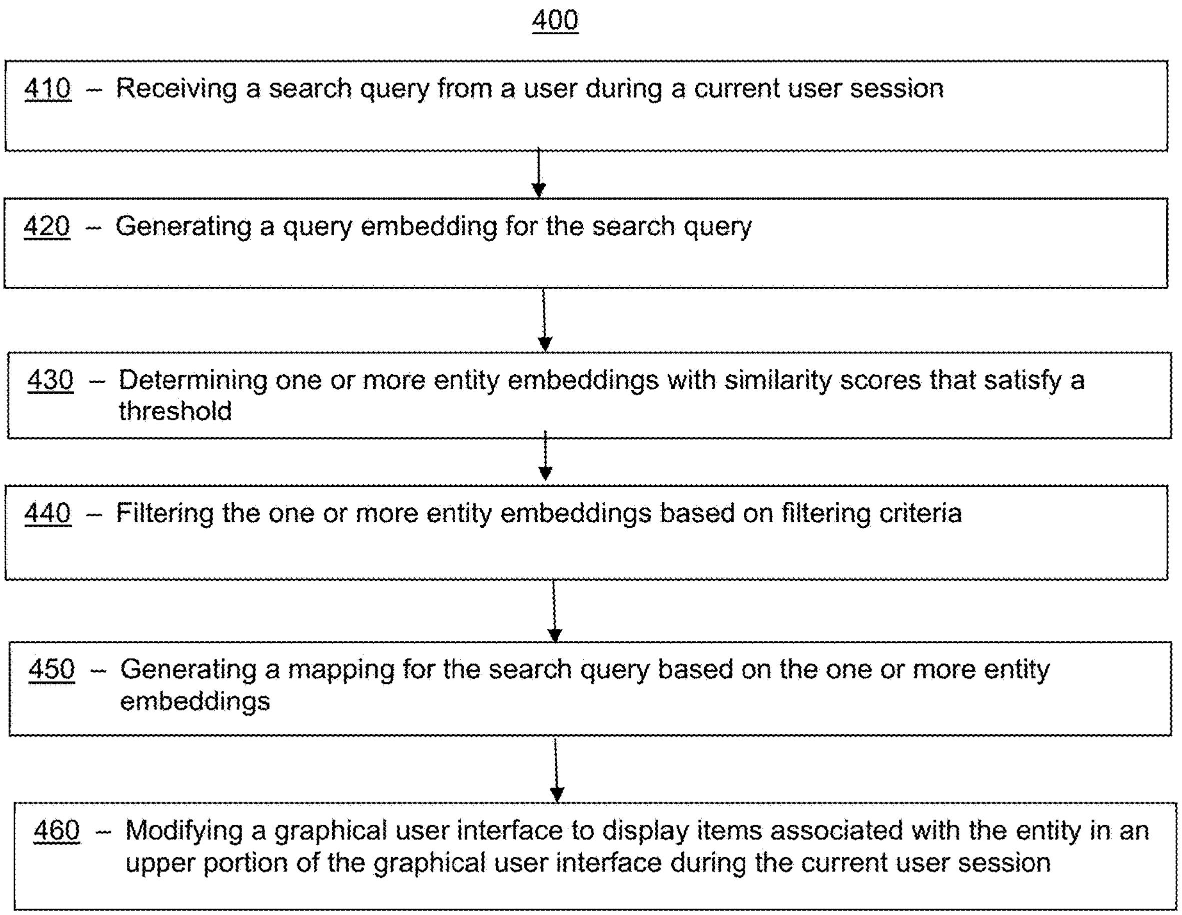
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as semantic engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving a search query from a user during a current user session. For example, a user accesses a website of an internet marketplace and inputs a search query to begin the current user session.

In many embodiments, method 400 can comprise an activity 420 of generating a query embedding for the search query. In some embodiments, generating the query embedding further comprises inputting the search query into a bi-encoder embedding model. In some embodiments, the bi-encoder embedding model is configured to generate one or more vectors for each keyword in the search query. In some embodiments, generating the query embedding further comprises aggregating the one or more vectors to generate the query embedding. In some embodiments, the bi-encoder embedding model is a bidirectional encoder representations from transformers (BERT) model. In some embodiments, the bi-encoder embedding model is a T5-encoder. In some embodiments, the bi-encoder embedding model is another encoder-only transformer model. In some embodiments, activity 420 can include utilizing the query embedding with an Approximate Nearest Neighbor (ANN) index.

Figure 5:
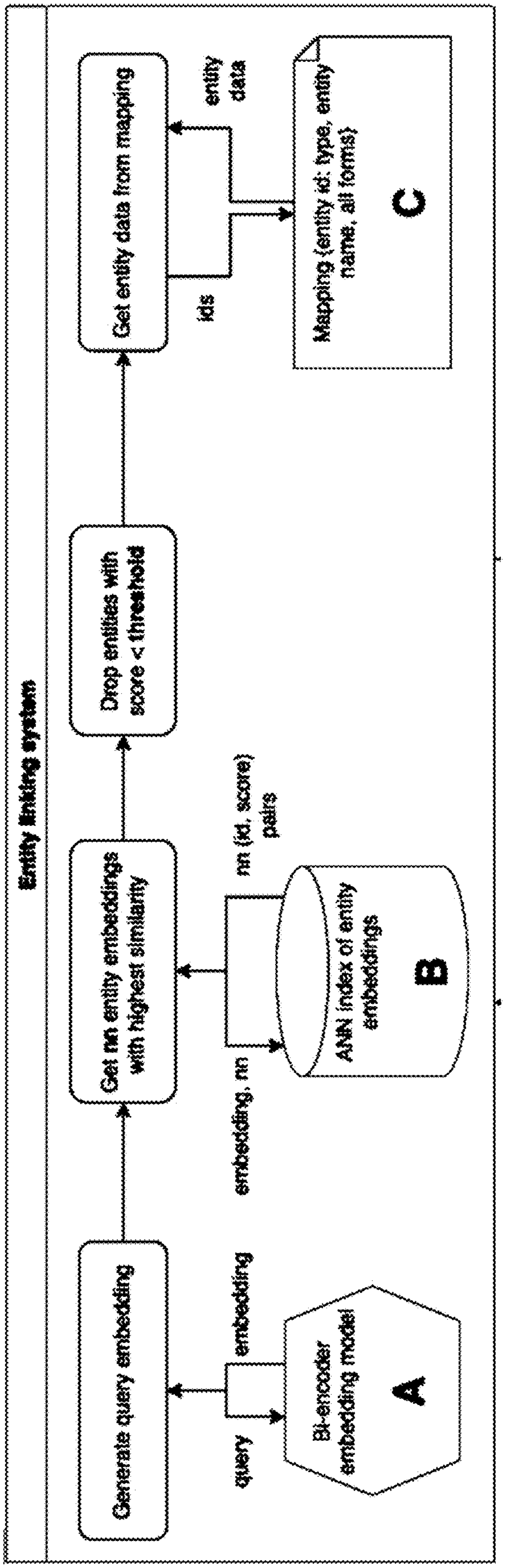
FIG. 5 illustrates an exemplary entity linking system architecture, according to certain embodiments.

Turning briefly to FIG. 5, an exemplary entity linking system architecture 500 is illustrated, according to an embodiment. The entity linking system architecture 500 includes a bi-encoder embedding model that is configured to generate query embeddings based on a search query.

Figure 7A:
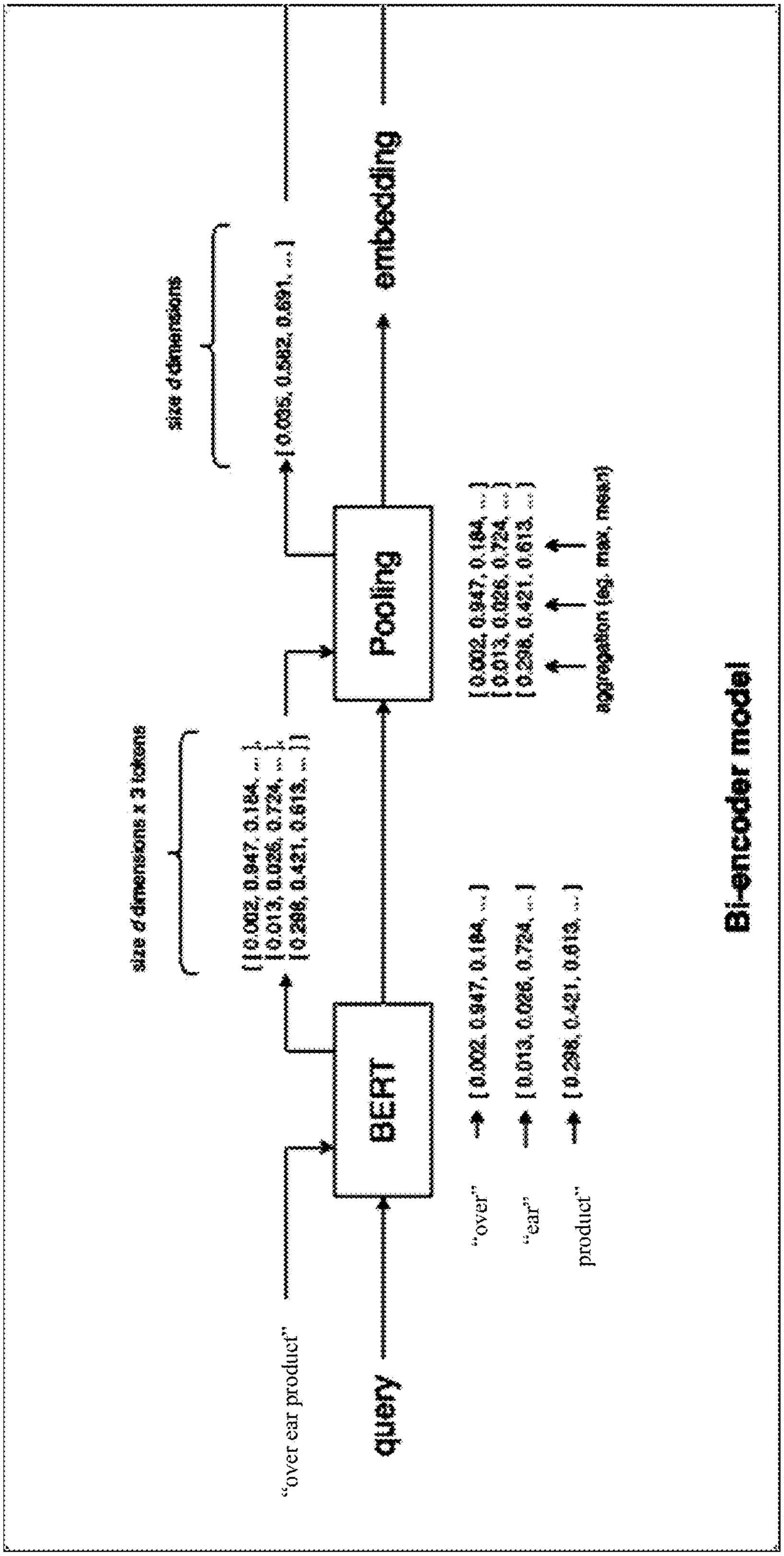
FIG. 7A illustrates an exemplary alternate bi-encoder model, according to certain embodiments.

Turning to FIG. 7A, an alternate bi-encoder model 700 is illustrated, according to an embodiment. In some embodiments, the alternate bi-encoder model 700 is a more detailed view of the bi-encoder embedding model illustrated in FIG. 5. In some embodiments, the alternate bi-encoder model 700 can implement the activity 420 (FIG. 4).

Returning to FIG. 4, in many embodiments, method 400 can comprise an activity 430 of determining one or more entity embeddings with similarity scores that satisfy a threshold. In some embodiments, the one or more entity embeddings including keywords associated with entities. In some embodiments, entity corresponds to a named entity that corresponds to a name of a person, place, or thing. For example, an entity can correspond to a company. That is, a search query for "over ear product" can be linked to the entity (i.e., company A) that makes and/or sells over ear products such as headphones. In some embodiments, determining the one or more entity embeddings with the similarity scores that satisfy the threshold further comprises analyzing the query embedding using a nearest neighbor search with the one or more entity embeddings in the ANN index. In some embodiments, determining the one or more entity embeddings with the similarity scores that satisfy the threshold further comprises identifying a set from the one or more entity embeddings that have a similarity score above the threshold. In some embodiments, determining the one or more entity embeddings with the similarity scores that satisfy the threshold further comprises identifying a set from the one or more entity embeddings whose similarity to the query embedding lies above the threshold for a defined similarity metric. For example, the similarity metric can be a Euclidean distance or cosine distance between query embedding and entity embedding vectors.

Turning briefly to FIG. 5, the exemplary entity linking system architecture 500 includes an ANN index of entity embeddings that is configured to generate a nearest neighbor entity embedding with a highest similarity score to the query embedding from the bi-encoder embedding model.

Figure 7B:
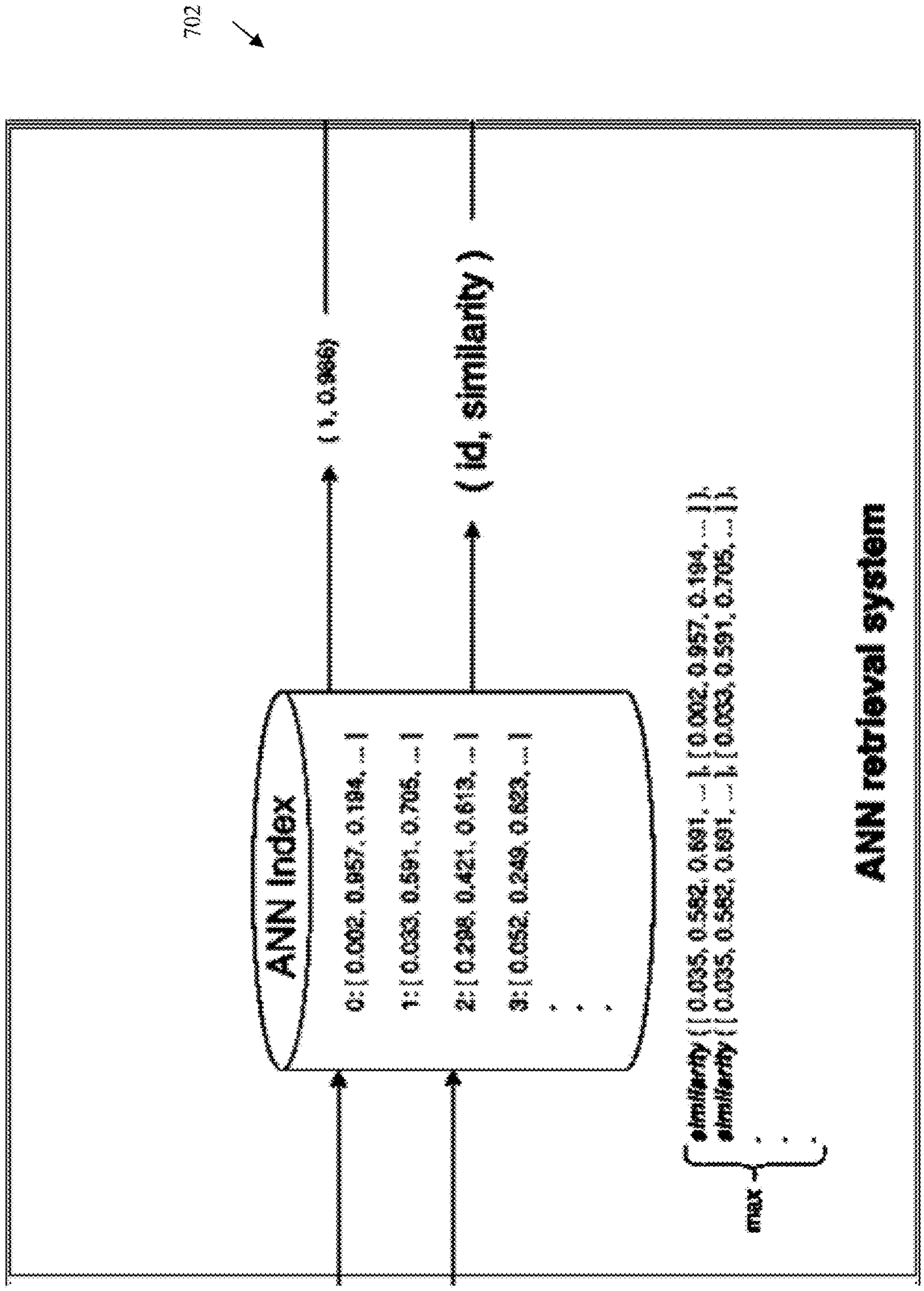
FIG. 7B illustrates an exemplary alternate ANN retrieval system, according to certain embodiments.

Turning to FIG. 7B, an alternate ANN retrieval system 702 is illustrated, according to an embodiment. In some embodiments, the alternate ANN retrieval system 702 is a more detailed view of the ANN index of entity embeddings illustrated in FIG. 5. In some embodiments, the alternate ANN retrieval system 702 can implement the activity 430 (FIG. 4). In some embodiments, the alternate ANN retrieval system 702 is a vector database storing compressed d-dimensional embeddings for each entity. In some embodiments, d corresponds to a dimension of the embedding vector generated by the bi-encoder embedding model. For example, the alternate ANN retrieval system 702 is a vector database storing compressed 768-dimensional embeddings for each entity. In some embodiments, alternate ANN retrieval system 702 utilizes a k-nearest neighbor search. At index creation time, entity embeddings are clustered into groups by similarity. The vector representing the center of each cluster is calculated and stored. At runtime, the search calculates the similarity between the query and each cluster center, then the similarity between the query and each entity in the clusters with the nearest k centers. The search returns (id, score) pairs representing a unique entity identifier "id" and the vector similarity score.

Returning to FIG. 4, in many embodiments, method 400 can comprise an activity 440 of filtering the one or more entity embeddings based on filtering criteria. In some filtering the one or more entity embeddings based on the filtering criteria further comprises removing one or more of the one or more entity embeddings that have a similarity score below 0.75. However, any similarity score can be used as the threshold to reduce a number of entity embeddings for further processing and to mitigate irrelevant entity embeddings from being processed.

In many embodiments, method 400 can comprise an activity 450 of generating a mapping for the search query based on the one or more entity embeddings. In some embodiments, the mapping includes an association between keywords in the search query and an entity. For example, a search query for "over ear product" can be linked to Company A that makes and/or sells headphones.

Turning briefly to FIG. 5, the exemplary entity linking system architecture 500 includes a mapping function that is configured to generate entity data from identifiers from the ANN index of entity embeddings.

Figure 7C:
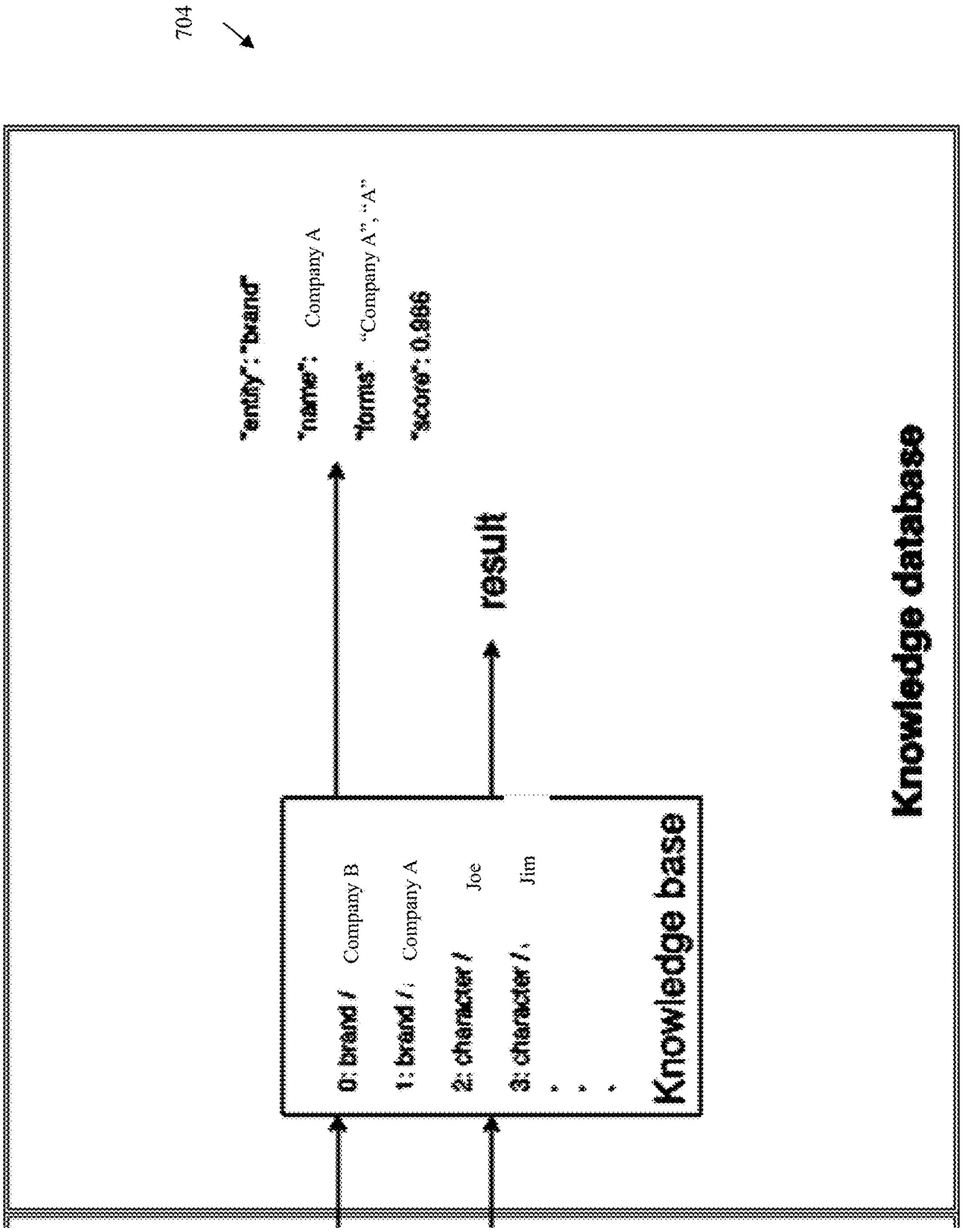
FIG. 7C illustrates an exemplary alternate mapping function, according to certain embodiments.

Turning to FIG. 7C, an alternate mapping function 704 (e.g., knowledge base) is illustrated, according to an embodiment. In some embodiments, the alternate mapping function is a more detailed view of the mapping function illustrated in FIG. 5. In some embodiments, the alternate mapping function 704 can implement the activity 450 (FIG. 4).

Returning to FIG. 4, in many embodiments, method 400 can comprise an activity 460 of modifying a graphical user interface to display items associated with the entity in an upper portion of the graphical user interface during the current user session.

Figure 8A:
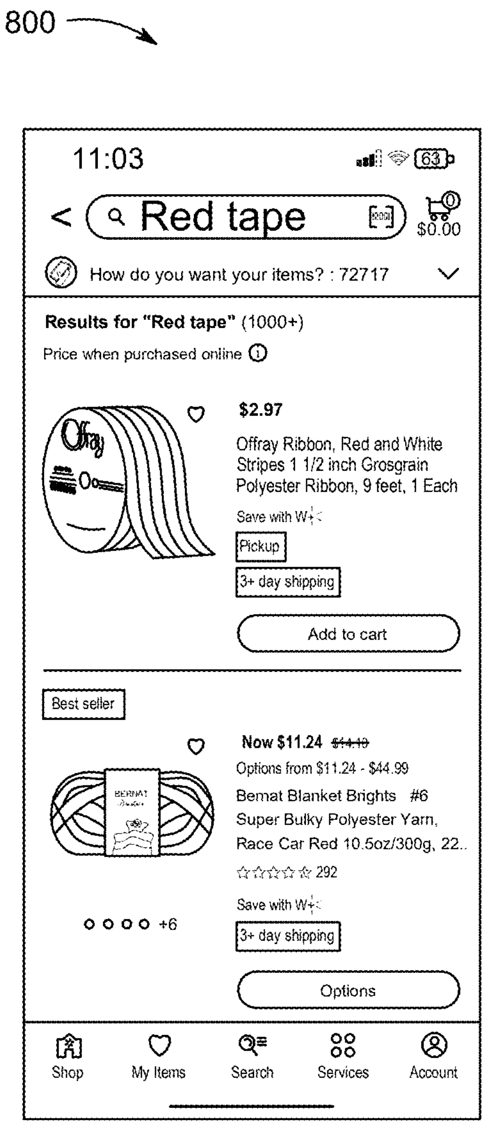
FIG. 8A illustrates an exemplary graphical user interface, according to certain embodiments.
Figure 8B:
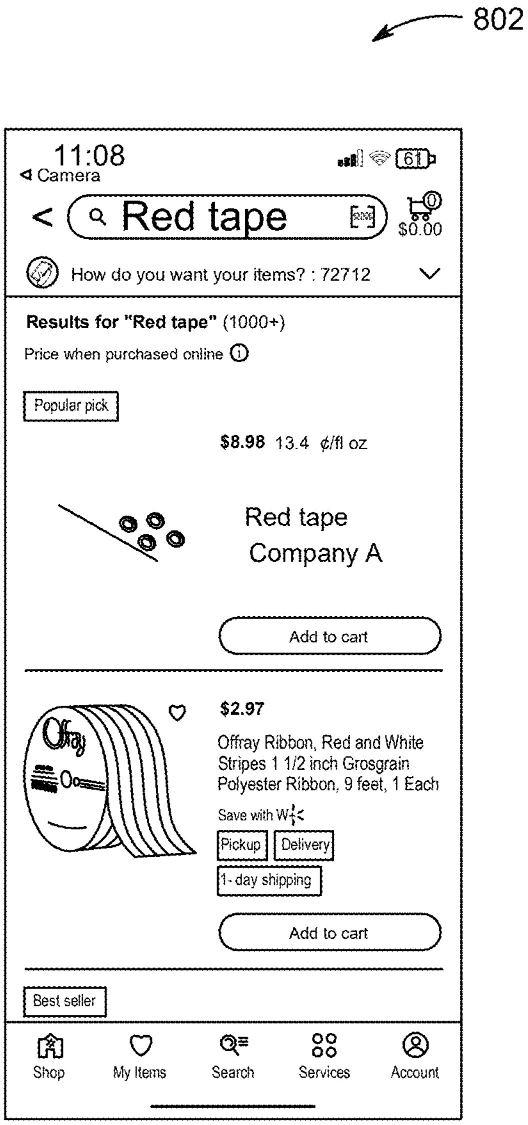
FIG. 8B illustrates an exemplary graphical user interface, according to certain embodiments.

Turning briefly to FIGS. 8A, a first graphical user interface 800 is illustrated in a first format for a search query "red tape" and is displaying a number of products in response to the search query. However, the first graphical user interface 800 has not been processed using the method 400 (FIG. 4). In the illustrated embodiment of FIG. 8B, a second graphical user interface 802 is illustrated that has been modified based on the method 400 (FIG. 4). In the illustrated embodiment of the second graphical user interface 802, the first graphical user interface 800 (FIG. 8A) has been modified to reposition a product for "red tape" by Company A in response to the search query "red tape" which has now been mapped to the brand of red tape by Company A.

Figure 6:
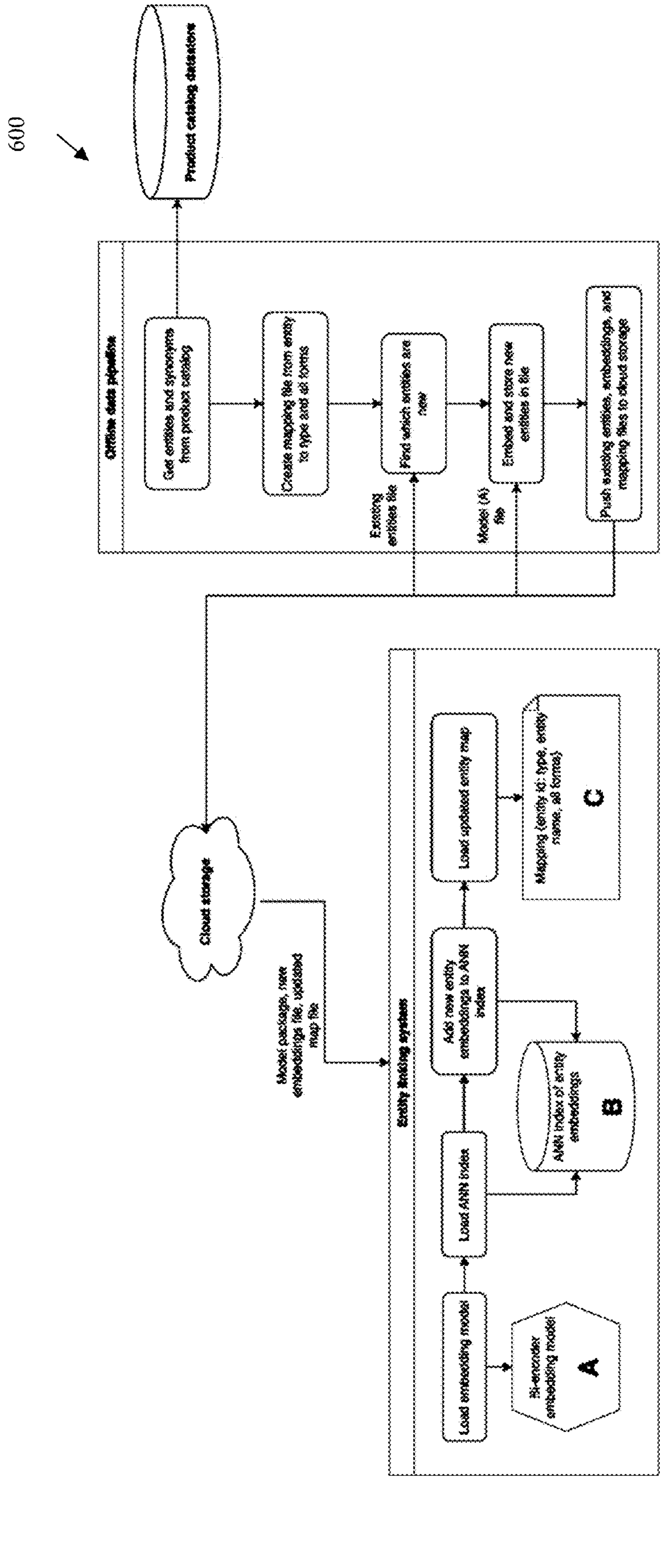
FIG. 6 illustrates an exemplary offline system architecture, according to certain embodiments.

Turning to FIG. 6, an offline system architecture 600 is illustrated, according to certain embodiments. In the illustrated embodiment, the offline system architecture 600 is configured for extracting named entities and synonyms associated with the named entities from a product catalog, and generating mappings for the named entities. In some embodiments, the mappings include an association between an entity, an entity type, and the synonyms. In some embodiments, the offline system architecture 600 is configured for utilizing a bi-encoder embedding model in an offline stage to generate entity embeddings for the named entities from the product catalog. For example, the offline system architecture 600 can utilize the entity linking system architecture 500 (FIG. 5) in accordance with the method 400 (FIG. 4). In some embodiments, the offline system architecture 600 can load the entity embeddings into an Approximate Nearest Neighbor (ANN) index in the offline stage.

Returning to FIG. 3, in several embodiments, communication system 311 can at least partially perform activity 410 (FIG. 4), and/or activity 460 (FIG. 4).

In several embodiments, evaluation system 312 can at least partially perform activity 420 (FIG. 4), and/or activity 430 (FIG. 4).

In a number of embodiments, analysis system 313 can at least partially perform activity 440 (FIG. 4), and/or activity 450 (FIG. 4).

In a number of embodiments, web server 320 can at least partially perform method 400.

Although systems and methods for semantic analysis have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8B may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

Embodiments disclosed herein are directed to a semantic match architecture that embeds an entire query, implicitly identifying mentions of entities, instead of performing named entity recognition.

Embodiments disclosed herein are directed to an ANN retrieval system that is regularly updated, to understand new entities without retraining of the b-encoder embedding model.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A system comprising:

one or more processors; and one or more non-transitory computer-readable media storing computing instructions that, when run on the one or more processors, cause the one or more processors to perform operations comprising:

generating, using an offline system architecture and in an offline stage, entity embeddings for named entities stored in one or more databases, wherein generating the entity embeddings comprises extracting the named entities and synonyms associated with the named entities;

loading, using the offline system architecture and in the offline stage, the entity embeddings into an Approximate Nearest Neighbor (ANN) index of entity embeddings;

receiving, from a user device and in an online stage, a search query during a current user session that is initiated based on a user device accessing a web server;

generating a query embedding for the search query after receiving the search query in the online stage;

determining, using an ANN retrieval system that includes the ANN index of the named entity embeddings, one or more entity embeddings, of the entity embeddings, with similarity scores that satisfy a threshold by analyzing the query embedding using a nearest neighbor search based on the one or more entity embeddings being loaded, in the offline stage, into the ANN index of entity embeddings and based on receiving the search query in the online stage, the one or more entity embeddings including keywords associated with the named entities;

filtering the one or more entity embeddings based on filtering criteria after determining the one or more entity embeddings using the ANN retrieval system;

generating, based on filtering the one or more entity embeddings, a mapping for the search query based on the one or more entity embeddings, the mapping including an association between keywords in the search query, one or more of the synonyms, and an entity of the named entities; and modifying a graphical user interface by causing display of items associated with the entity in an upper portion of the graphical user interface during the current user session.

2. The system of claim 1, wherein generating the query embedding further comprises inputting the search query into a bi-encoder embedding model, wherein the bi-encoder embedding model is configured to generate one or more vectors for each keyword in the search query.

3. The system of claim 2, wherein generating the query embedding further comprises aggregating the one or more vectors to generate the query embedding.

4. The system of claim 2, wherein the bi-encoder embedding model is a bidirectional encoder representations from transformers (BERT) model.

5. The system of claim 1, wherein filtering the one or more entity embeddings based on the filtering criteria comprises removing one or more of the one or more entity embeddings that have a similarity score below 0.75.

6. The system of claim 1, wherein generating the entity embeddings comprises:

utilizing, using the offline system architecture, a bi-encoder embedding model in the offline stage to generate the entity embeddings for the named entities.

7. A method implemented via execution of computing instructions configured to run at one or more processors and stored at one or more non-transitory computer-readable media, the method comprising:

generating, using an offline system architecture and in an offline stage, entity embeddings for named entities stored in one or more databases, wherein generating the entity embeddings comprises extracting the named entities and synonyms associated with the named entities;

loading, using the offline system architecture and in the offline stage, the entity embeddings into an Approximate Nearest Neighbor (ANN) index of entity embeddings;

receiving, from a user device and in an online stage, a search query from a user during a current user session that is initiated based on the user device accessing a web server;

generating a query embedding for the search query;

determining, using an ANN retrieval system that includes the ANN index of entity embeddings, one or more entity embeddings, of the entity embeddings, with similarity scores that satisfy a threshold by analyzing the query embedding using a nearest neighbor search based on the one or more entity embeddings being loaded, in the offline stage, into the ANN index of entity embeddings and based on receiving the search query in the online stage, the one or more entity embeddings including keywords associated with the named entities;

filtering the one or more entity embeddings based on filtering criteria after determining the one or more entity embeddings using the ANN retrieval system;

generating, based on filtering the one or more entity embeddings, a mapping for the search query based on the one or more entity embeddings, the mapping including an association between keywords in the search query, the synonyms, and an entity; and modifying a graphical user interface by causing a display of items associated with the entity in an upper portion of the graphical user interface during the current user session.

8. The method of claim 7, wherein generating the query embedding further comprises inputting the search query into a bi-encoder embedding model, wherein the bi-encoder embedding model is configured to generate one or more vectors for each keyword in the search query.

9. The method of claim 8, wherein generating the query embedding further comprises aggregating the one or more vectors to generate the query embedding.

10. The method of claim 8, wherein the bi-encoder embedding model is a bidirectional encoder representations from transformers (BERT) model.

11. The method of claim 7, wherein filtering the one or more entity embeddings based on the filtering criteria further comprises removing one or more of the one or more entity embeddings that have a similarity score below 0.75.

12. The method of claim 7, wherein generating the entity embeddings comprises:

extracting the named entities and synonyms associated with the named entities.

13. The method of claim 7, wherein generating the entity embeddings comprises:

utilizing, using the offline system architecture, a bi-encoder embedding model in the offline stage to generate the entity embeddings for the named entities.

14. The method of claim 7, wherein filtering the one or more entity embeddings comprises:

filtering the one or more entity embeddings based on the filtering criteria by removing, from further processing, at least one of the one or more entity embeddings having a similarity score below the threshold, thereby reducing a number of entity embeddings subjected to the further processing.

15. A non-transitory, computer-readable medium comprising instructions that, when executed by a processing resource, cause the processing resource to perform operations comprising:

generating, using an offline system architecture and in an offline stage, entity embeddings for named entities stored in one or more databases, wherein generating the entity embeddings comprises extracting the named entities and synonyms associated with the named entities;

loading, using the offline system architecture and in the offline stage, the entity embeddings into an Approximate Nearest Neighbor (ANN) index of entity embeddings;

receiving, from a user device and in an online stage, a search query from a user during a current user session that is initiated in response to determining that the user device accesses a web server;

generating a query embedding for the search query after receiving the search query in the online stage;

determining, using an ANN retrieval system that includes the ANN index of entity embeddings, one or more entity embeddings, of the entity embeddings, with similarity scores that satisfy a threshold by analyzing the query embedding using a nearest neighbor search based on the one or more entity embeddings being loaded, in the offline stage, into the ANN index of entity embeddings and based on receiving the search query in the online stage, the one or more entity embeddings including keywords associated with the named entities;

filtering the one or more entity embeddings based on filtering criteria after determining the one or more entity embeddings using the ANN retrieval system;

generating, based on filtering the one or more entity embeddings, a mapping for the search query based on the one or more entity embeddings, the mapping including an association between keywords in the search query, the synonyms, and an entity; and modifying, during the current user session, a graphical user interface by causing display of items associated with the entity in an upper portion of the graphical user interface.

16. The non-transitory, computer-readable medium of claim 15, wherein filtering the one or more entity embeddings comprises:

filtering the one or more entity embeddings based on the filtering criteria by removing, from further processing, at least one of the one or more entity embeddings having a similarity score below the threshold, thereby reducing a number of entity embeddings subjected to the further processing.

17. The non-transitory, computer-readable medium of claim 15, wherein the offline system architecture is configured for utilizing a bi-encoder embedding model in the offline stage to generate the entity embeddings.

18. The non-transitory, computer-readable medium of claim 15, wherein generating the query embedding further comprises inputting the search query into a bi-encoder embedding model, wherein the bi-encoder embedding model is configured to generate one or more vectors for each keyword in the search query.

19. The non-transitory, computer-readable medium of claim 15, wherein filtering the one or more entity embeddings based on the filtering criteria comprises removing one or more of the one or more entity embeddings that have a similarity score below a particular value.

20. The non-transitory, computer-readable medium of claim 15, wherein generating the entity embeddings comprises:

utilizing, using the offline system architecture, a bi-encoder embedding model in the offline stage to generate the entity embeddings for the named entities.

* * * * *